(12) United States Patent
Lazaratos et al.

(10) Patent No.: US 8,990,053 B2
(45) Date of Patent: Mar. 24, 2015

(54) METHOD OF WAVELET ESTIMATION AND MULTIPLE PREDICTION IN FULL WAVEFIELD INVERSION

(75) Inventors: Spyridon K. Lazaratos, Houston, TX (US); Ke Wang, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 484 days.

(21) Appl. No.: 13/356,342

(22) Filed: Jan. 23, 2012

(65) Prior Publication Data

US 2012/0253758 A1    Oct. 4, 2012

(51) Int. Cl.
*G06F 7/60* (2006.01)
*G06F 17/10* (2006.01)
*G01V 1/28* (2006.01)

(52) U.S. Cl.
CPC ............ *G01V 1/282* (2013.01); *G01V 2210/67* (2013.01); *G01V 2210/56* (2013.01); *G01V 2210/614* (2013.01)
USPC ...................................... 703/2; 703/10; 702/6

(58) Field of Classification Search
CPC ..................... G01V 2210/614; G01V 2210/42; G01V 2210/56; G01V 99/00; G01V 1/303; G01V 1/28; G01V 1/282; G01V 1/30; G01V 1/301; G01V 2210/66; G01V 2210/679; G01V 2210/67; G01V 1/302
USPC ........................ 703/3, 9–10; 702/6, 14, 17, 18
See application file for complete search history.

(56) References Cited

U.S. PATENT DOCUMENTS

| 3,812,457 | A | 5/1974 | Weller |
| 3,864,667 | A | 2/1975 | Bahjat |
| 4,159,463 | A | 6/1979 | Silverman |
| 4,168,485 | A | 9/1979 | Payton et al. |
| 4,545,039 | A | 10/1985 | Savit |

(Continued)

FOREIGN PATENT DOCUMENTS

| EP | 1 094 338 | 4/2001 |
| EP | 1 746 443 | 1/2007 |

(Continued)

OTHER PUBLICATIONS

Boonyasiriwat, C. et al. (2010), 3D Multisource Full-Waveform using Dynamic Random Phase Encoding, SEG Denver 2010 Annual Meeting, pp. 1044-1049.

(Continued)

*Primary Examiner* — Eunhee Kim
(74) *Attorney, Agent, or Firm* — ExxonMobil Upstream Research Company Law Dept.

(57) ABSTRACT

Wavelet estimation method, particularly advantageous for full wavefield inversion ("FWI") of seismic data, that makes use of both the primary and multiple reflections in the data. The inventive method uses an FWI algorithm to generate a subsurface model from primary reflections (101) in a shallow layer before first arrival of multiple reflections (101). The model is then used to simulate multiples (102). The wavelet is subsequently modified (104) such that the simulated multiples closely match the true recorded multiples (103). The simulated multiples may then be subtracted from the measured data (105) thereby creating a deeper top layer of data substantially free of multiples, and the method may then be repeated to extend the subsurface model to a greater depth (106).

9 Claims, 5 Drawing Sheets

(56) References Cited

U.S. PATENT DOCUMENTS

| | | |
|---|---|---|
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,169,959 B1 * | 1/2001 | Dragoset, Jr. ................. 702/17 |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,027,927 B2 | 4/2006 | Matsuoka et al. |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 * | 11/2009 | Tabti et al. ..................... 367/24 |
| 7,620,534 B2 | 11/2009 | Pita et al. |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 * | 9/2010 | Robertsson et al. ............ 367/24 |
| 7,835,072 B2 | 11/2010 | Izumi |
| 7,840,625 B2 | 11/2010 | Candes et al. |
| 7,940,601 B2 | 5/2011 | Ghosh |
| 8,437,998 B2 * | 5/2013 | Routh et al. .................. 703/10 |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2006/0250891 A1 * | 11/2006 | Krohn ............................ 367/38 |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 * | 1/2009 | Song ................................ 703/6 |
| 2009/0067041 A1 | 3/2009 | Izumi |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0259406 A1 | 10/2009 | Khadhraoui et al. |
| 2009/0323470 A1 * | 12/2009 | Ferris ............................. 367/24 |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212909 A1 | 8/2010 | Baumstein et al. |
| 2010/0265797 A1 | 10/2010 | Robertsson et al. |
| 2010/0270026 A1 * | 10/2010 | Lazaratos et al. ............. 166/369 |
| 2010/0286919 A1 | 11/2010 | Lee et al. |
| 2010/0299070 A1 | 11/2010 | Abma |
| 2011/0000678 A1 | 1/2011 | Krebs et al. |

(56) References Cited

U.S. PATENT DOCUMENTS

| | | |
|---|---|---|
| 2011/0040926 A1 | 2/2011 | Frost et al. |
| 2011/0051553 A1 | 3/2011 | Scott et al. |
| 2011/0090760 A1* | 4/2011 | Rickett et al. .................. 367/73 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dunkin, J.w. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Igel, H. et al. (1996), "Waveform inversion of marine reflection seismograms for P impedance and Poisson's ratio," *Geophys. J. Int.* 124i, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and $70^{th}$ Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," $70^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1455.

Lecomte, I. (2008), "Resolution and illumination analyses in PSDM: A ray-based approach," The Leading Edge, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Maharramov, M. et al. (2007) , "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

Dickens, T.A. et al. (2011), RTM angle gathers using Poynting vectors, *SEG Expanded Abstracts* 30, pp. 3109-3113.

Helbig, K. (1994), "Foundations of Anisotropy for Exploration Seismics," Chapter 5, pp. 185-194.

Hu, L.Z. et al. (1987), "Wave-field transformations of vertical seismic profiles," *Geophysics* 52, pp. 307-321.

Lazaratos, S. et al. (2011), "Improving the convergence rate of full wavefield inversion using spectral shaping," *SEG Expanded Abstracts* 30, pp. 2428-2432.

(56) References Cited

OTHER PUBLICATIONS

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xie, X. et al. (2002), "Extracting angle domain information from migrated wavefield," *SEG Expanded Abstracts*21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstrcts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

U.S. Appl. No. 13/224,005, filed Sep. 1, 2011, Routh et al.

Aki, K. et al. (1980), "Quantitative Seismology: Theory and Methods vol. I," W.H. Freeman and Co., p. 173.

Baumstein, A. et al. (2009), "Scaling of the Objective Function Gradient for Full Wavefield Inversion," SEG Houston 2009 Int'l. Expo and Annual Meeting, pp. 2243-2247.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," *SEG Expanded Abstracts*, pp. 2288-2292.

Beylkin, G. (1985), "Imaging of discontinuities in the inverse scattring problem by inversion of a causal generalized Radon transform," *J. Math. Phys.* 26, pp. 99-108.

Bonomi, E. et al. (2006), "Wavefield Migration plus Monte Carlo Imaging of 3D Prestack Seismic Data," *Geophysical Prospecting* 54, pp. 505-514.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," in E. Wolf. editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," *Phil. Mag.* 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Schuster, G.T. et al. (2010), "Theory of Multisource Crosstalk Reduction by Phase-Encoded Statics," SEG Denver 2010 Ann. Meeting, pp. 3110-3114.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield, " *Geophysics* 49, pp. 592-606.

(56) References Cited

OTHER PUBLICATIONS

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), Reverse time migration with optimal checkpointing, *Geophysics* 72(5), pp. P.SM213-SM221.

Tarantola, A. (1984), "Inversion of seismic reflection data in the acoustic approximation," *Geophysics* 49, pp. 1259-1266.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Trantham, E.C. (1994), "Controlled-phase acquisition and processing," *SEG Expanded Abstracts* 13, pp. 890-894.

van Groenestijn, G.J.A. et al. (2009), "Estimating primaries by sparse inversion and application to near-offset reconstruction," *Geophyhsics* 74(3), pp. A23-A28.

van Manen, D.J. (2005), "Making wave by time reversal," SEG International Exposition and 75$^{th}$ Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Veerschuur, D.J. et al. (1989), "Wavelet Estimation by Prestack Multiple Elimination," *SEG Expanded Abstracts* 8, pp. 1129-1132.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, *Expanded Abstracts*, pp. 2537-2541.

Weglein, A.B. (2003), "Inverse scattering series and seismic exploration," *Inverse Problems* 19, pp. R27-R83.

Wu, R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

\* cited by examiner

METHOD OF WAVELET ESTIMATION AND MULTIPLE PREDICTION IN FULL WAVEFIELD INVERSION

CROSS-REFERENCE TO RELATED APPLICATION

This application claims priority from U.S. Provisional Patent Application No. 61/470,237 filed on Mar. 31, 2011, entitled Method of Wavelet Estimation and Multiple Prediction in Full Wavefield Inversion, which is incorporated by reference herein in its entirety.

FIELD OF THE INVENTION

This invention relates generally to the field of geophysical prospecting and, more particularly to seismic data processing. Specifically, the invention is a method of wavelet estimation and multiple prediction in full wavefield inversion of seismic data.

BACKGROUND OF THE INVENTION

Full waveform inversion ("FWI") is a method of inverting seismic data to infer earth subsurface properties that affect seismic wave propagation. Its forward modeling engine utilizes finite difference or other computational methods to model propagation of acoustic or elastic seismic waves through the earth subsurface model. FWI seeks the optimal subsurface model such that simulated seismic waveforms match field recorded seismic waveforms at receiver locations. The theory of FWI was initially developed by Tarantola (1989). Research and applications of FWI in exploration geophysics have been very active in the past decade, thanks to the dramatic increase of computing power.

It is well known that simulated waveforms depend linearly on the input source wavelet when linear acoustic or elastic wave equations are used to model seismic wave propagation. In fact, accurate estimation of source wavelet plays a critical role in FWI. Delprat-Jannaud and Lailly (2005) pointed that accurate wavelet measurements appear to be a major challenge for a sound reconstruction of impedance profiles in FWI. They noticed that a small error in the source wavelet leads to a strong disturbance in the deeper part of the inverted model due to the mismatch of multiple reflections. They concluded that "the classical approach for estimating the wavelet by minimizing the energy of the primary reflection waveform is not likely to provide the required accuracy except for very special cases".

Indeed, inversion of primary reflections without well control faces a fundamental non-uniqueness in estimating the wavelet. For example, larger reflection events can be caused by larger impedance contrasts or a stronger source. Similar ambiguity exits for wavelet phase and power spectrum. Well data are commonly used to constrain wavelet strength and phase. But well logs are not always available, especially in an early exploration setting, or in shallow subsurface cases.

There have been extensive studies of wavelet estimation in the geophysical literature. In particular, inversion of wavelet signature for FWI was discussed by Wang et al. (2009) and the references therein. However, these methods all implicitly rely on direct arrivals or refracted waves for wavelet estimation. Because these transmitted modes propagate along mostly horizontal ray paths, they are influenced by effects (e.g. radiation pattern, complex interaction with the free surface) not affecting the near-vertical reflection ray paths. Such effects are often difficult to describe accurately and to simulate.

Hence, there is a need to estimate the wavelet for the vertically-propagated energy, and this is particularly relevant for reflection-dominated applications (e.g. deep-water acquisition, imaging of deeper targets).

Multiples are considered to be noise in traditional seismic processing since they often contaminate primary reflections and make interpretation more difficult. On the other hand, it is known that multiples may also be useful for constraining subsurface properties and the seismic source wavelet. Verschuur et al. (1989, 1992) proposed a method of surface-related multiple elimination (SRME), by which wavelet estimation can be performed along with multiple elimination. The principle of SRME has been extended to an inversion scheme by G. J. A. van Groenestijn et al. (2009) to reconstruct the missing near-offset primaries and the wavelet. However it is unclear whether the optimal wavelet for SRME is also optimal for FWI. Papers such as van Groenestijn and Verschuur perform their multiple modeling and wavelet estimation in the time domain, i.e., data-driven without a subsurface model.

SUMMARY OF THE INVENTION

In one embodiment, the invention is a computer-implemented seismic processing method comprising generating and simultaneously optimizing a source wavelet and subsurface model to an extendable depth, wherein simulated waveforms of both primary reflections and multiple reflections are generated from the source wavelet and the subsurface model in the depth domain and are then compared for a match to waveforms as recorded at seismic receiver locations.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a suitably programmed computer.

DETAILED DESCRIPTION OF EXAMPLE EMBODIMENTS

The present invention is a wavelet estimation method for FWI applications that makes use of both the primary and multiple reflections in the data. The present inventive method uses the FWI algorithm to generate a subsurface model from primary reflections. The model is then used to simulate multiples. The wavelet is subsequently modified such that the simulated multiples closely match the true recorded multiples.

In addition to providing an accurate wavelet estimate, this method may provide some benefits as a multiple elimination strategy. In particular, it has no need for dense cross-line sampling to model multiples in 3D: once a model of the shallow subsurface has been built with FWI, modeling multiples is straightforward for any acquisition configuration. Also, because the method is model-based and does not rely on primary/multiple moveout separability, it naturally offers good protection of primaries.

Figure 1:
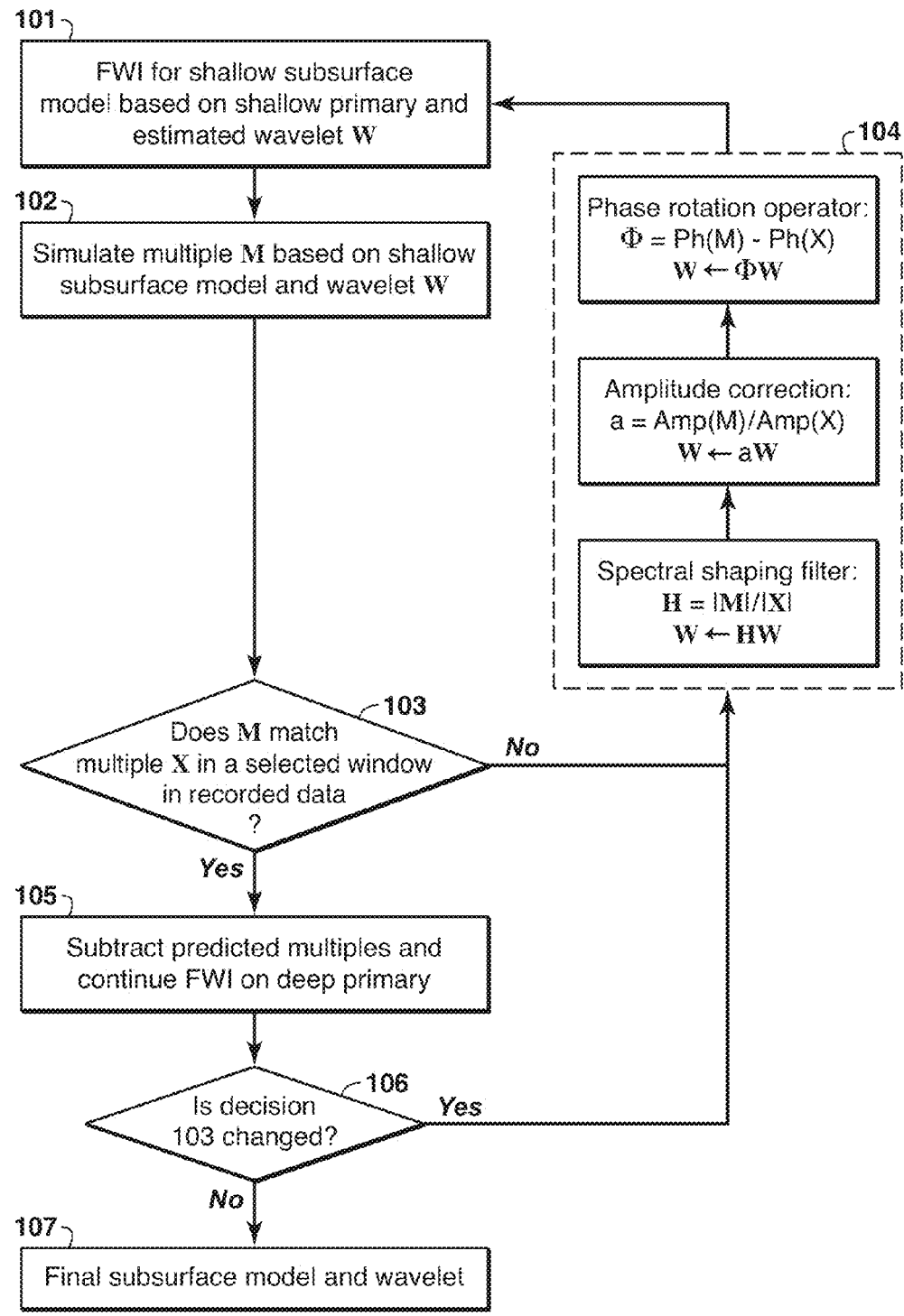
FIG. 1 is a flowchart showing basic steps in the present inventive method.

Following the FIG. 1 flow chart showing basic steps in one embodiment of this invention, deep water seismic data is used as an example to demonstrate the inventive method. Attention is primarily directed to wavelet estimation and modeling of water-surface related multiples, but persons skilled in the technical field will readily understand that a similar approach can be applied to other types multiples, an example of which is shown in FIG. 2.

Figure 2:
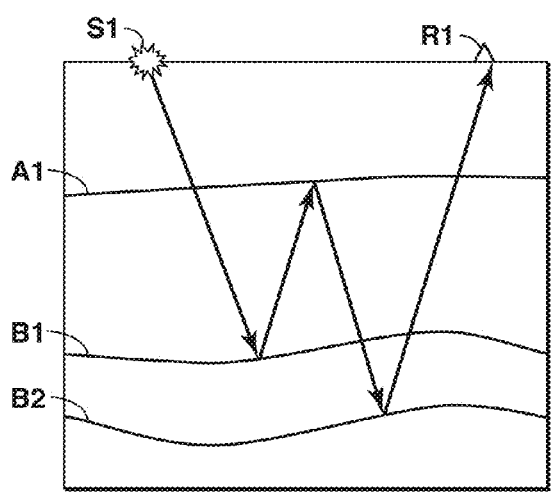
FIG. 2 shows a diagrammatic illustration of multiple reflections in seismic acquisition with source S1 and receiver R1.

FIG. 2 shows a diagrammatic illustration of multiple reflections in seismic acquisition with source S1 and receiver R1. Multiples are considered as signals reflected more than once between any subsurface boundary Ai and any subsurface boundary Bi in the figure. In practice, at least one strong reflector is present to make an interesting scenario. Assume A1 in the figure is a strong reflector, which could be the water-air interface in marine data or air-earth interface in land acquisition, or salt boundary, or any high-contrast subsurface. The multiples of interest are now defined as signals reflected more than once between A1 and any of the Bi's. The term shallow primaries means signals arriving before the first arrival of the multiples of interest. Accordingly, deep primaries are defined as primary reflections arriving after the first arrival of the multiples of interest.

Figure 3:
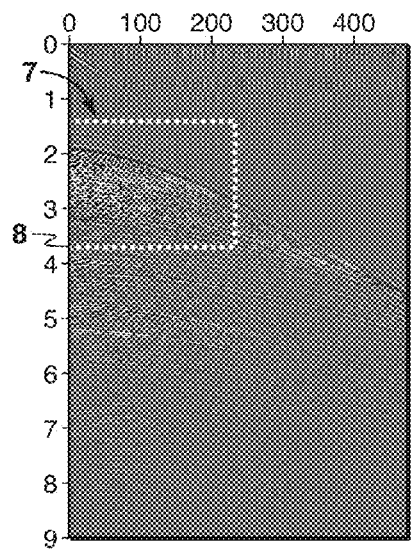
FIG. 3 shows a shot gather of deep water seismic data, showing shallow primaries arriving before the multiples of interest, which are water-surface related multiples.

In step 101 of FIG. 1, a shallow subsurface model is inverted from shallow primaries. FIG. 3 shows one shot-gather of this deep water seismic data set. In this case, the shallow primaries 7 refer to arrivals before 3.7 s since the water-surface related multiple arrives after 3.7 s. We are able to identify water-surface related multiples because the earliest arrival of these multiples should be 2× water bottom reflection time, by definition. That is approximately 3.7 s. (Time is shown on the vertical scale in FIG. 3, increasing downward.) The multiples of interest are water-surface related multiples. Relating back to FIG. 2, A1 is now the water-air interface and B1 represents the water-bottom. The "shallow primaries" used for inverting a shallow subsurface model are in frame 7, which arrive before water-bottom multiples 8.

Figure 4:
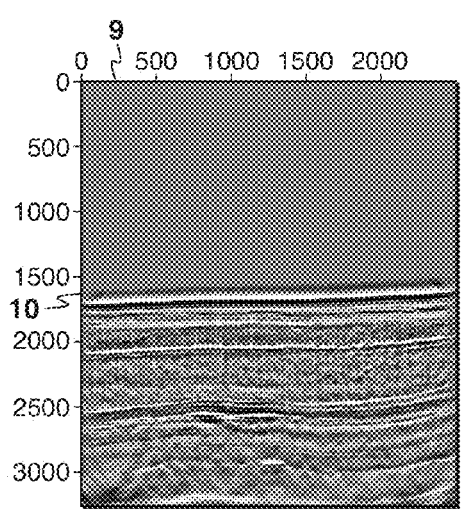
FIG. 4 shows an inverted shallow subsurface model from the shallow primaries in FIG. 3.

A P-wave velocity model in the depth domain is now constructed from the shallow primaries referred to above, using a standard velocity model building tool. Applying acoustic FWI to the shallow primary gives the shallow acoustic impedance in FIG. 4, which is in the depth-cdp domain. Thus, FIG. 4 shows the inverted shallow subsurface model from "shallow primaries" 7 in FIG. 3. The water-surface location is denoted by 9 and water-bottom is denoted by 10. Notice that elastic FWI or more sophisticated physics could be applied in this step to capture waveforms more accurately up to longer offsets.

Figure 5:
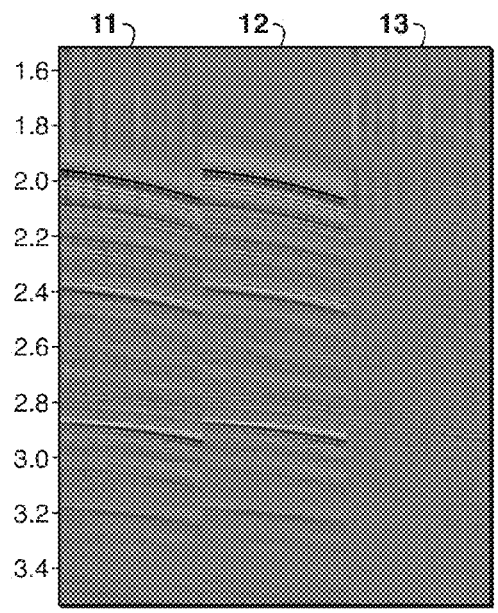
FIG. 5 shows a recorded shot gather, a simulated shot gather based on the inverted shallow subsurface model in FIG. 4, and their data residual.

FIG. 5 shows recorded shot-gather 11 (which is just region 7 from FIG. 3 with the time scale expanded), a simulated shot-gather 12 based on subsurface model in FIG. 4, and the difference between 11 and 12 is shown in 13. The inverted shallow earth model in FIG. 4 explains the measured data very well, as evidenced by the small data residual 13. Notice that surface-related multiples are simulated by having the air-water interface in the model, although they are not present before 3.7 s, and hence are not shown in FIG. 5.

Figure 6:
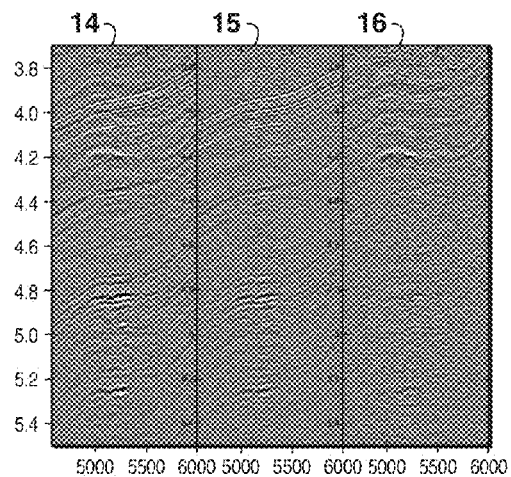
FIG. 6 shows recorded data having both deep primaries and multiples, simulated multiples based on the shallow subsurface model in FIG. 4, and the subtraction of the simulated multiples from the recorded data.

In step 102, multiple reflections are simulated, i.e. modeled, using the shallow subsurface velocity model obtained by inversion in step 101 and an assumed seismic wavelet. By extending the simulation time to 5.5 s, we are able to simulate water-surface related multiples based on the subsurface model in FIG. 4. In FIG. 6, 14 shows recorded seismic data in a 1 km common offset domain, which includes both deep primaries and water-surface related multiples generated from shallow sub-surfaces; 15 shows simulated water-surface related multiples based on the shallow subsurface model in FIGS. 4; and 16 is a subtraction of 15 from 14, and so 16 are the estimated deep primaries.

Figure 7:
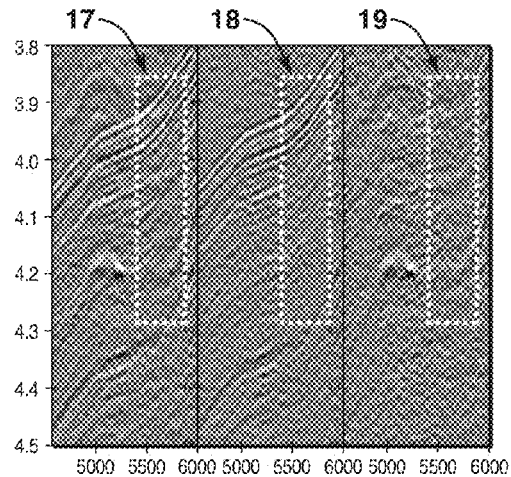
FIG. 7 shows blow-up of FIG. 6 (3.8 s to 4.5 s) to clearly demonstrate quality of multiple prediction, with the frame showing data selected to perform wavelet estimation.

In step 103, the simulated multiples are compared to the recorded data within a selected window to determine the degree of mismatch. FIG. 7 shows a blow-up of FIG. 6 (3.8 s to 4.5 s) to clearly demonstrate the quality of the multiple prediction. The window 17 was chosen in the recorded data, trying to minimize overlapping between multiple and primary reflections. The corresponding window in the simulated multiples is denoted by 18. Data in the windows 17 and 18 are selected to perform wavelet estimation. The objective in the wavelet estimation is to minimize differences between recorded data 17 and simulated multiples 18, since the window was chosen to avoid containing strong deep primaries in the data. The difference resulting from an optimal wavelet is shown in 19.

If the match between simulated multiples and recorded data in step 103 is not satisfactory, the wavelet used to simulate the multiples may be adjusted in step 104 by correcting any one or more of the three wavelet properties that go into estimating the wavelet, i.e. wavelet amplitude, phase and power spectrum. Simulated multiples in 18 will not match recorded multiples in 17 unless optimal wavelet estimation is achieved. 19 shows the difference between 17 and 18 when the optimal wavelet estimation is used to generate the subsurface model in FIG. 4. The three wavelet adjustments are discussed next in more detail.

Wavelet amplitude. The amplitude of the primary reflection p is determined by the source wavelet S, source (receiver) ghost $G_{src}(G_{src})$, subsurface reflectivity $R_i$ and geometric spreading factor $L_p$:

$$p = (S * G_{src} G_{rec}) \cdot R_i / L_p. \quad (1)$$

Similarly, the amplitude of the multiple reflection m is determined by the free-surface reflectivity $R_{fs}$ and the reflectivity of multiple reflection locations. For instance, a "pegleg" multiple is related to the water-bottom reflectivity $R_{wb}$ by:

$$m = (S * G_{src} * G_{rec}) \cdot R_i \cdot R_{wb} \cdot R_{fs} / L_m. \quad (2)$$

Dividing (2) by (1) produces the following relation between relative multiple/primary amplitude ratio and wavelet amplitude, assuming perfect reflection at the water-surface ($R_{fs}=1$):

$$\frac{m}{p} \propto R_{wb} \propto \frac{1}{S} \quad (3)$$

where $L_p$ and $L_m$ are fixed relative to $R_{wb}$ and are hence treated as proportionality constants. The second proportionality in (3) comes from equation (1) which, where the subsurface reflector is the water bottom, can be written as $$R_{wb} \propto \frac{1}{S}$$

where the remaining terms from equation (1) make up a proportionality constant independent of S. Given that the primary reflections in the field data were matched by the inverted model using a wavelet of strength S at step 101, equation (3) then indicates that $$m \propto \frac{1}{S}.$$

Thus, if the simulated multiples are too large or too small compared to the multiples in the recorded data, this can be adjusted by increasing or decreasing the source wavelet's strength proportionately. In other words, the geophysical meaning of equation (3) is that, the relative water-bottom multiple/primary amplitude ratio constrains the water-bottom reflectivity. Knowledge of the water-bottom reflectivity allows us then to estimate the wavelet amplitude by matching the amplitude of the water-bottom primary reflection.

Figure 8:
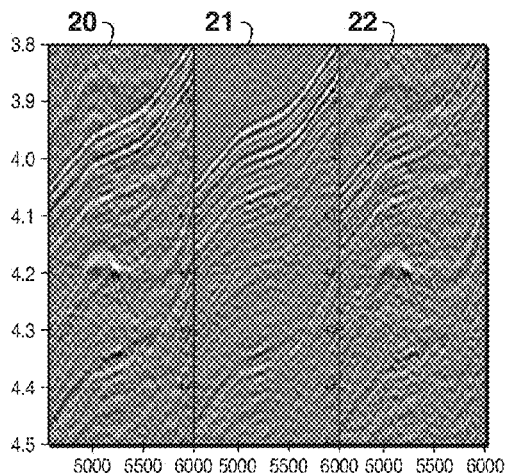
FIG. 8 shows multiple modeling with 30-deg phase rotation applied to the optimal wavelet: (from left) recorded data, simulated multiples based on rotated wavelet and inverted subsurface model, and their residual.

Wavelet phase. To demonstrate how wavelet phase may be corrected in the present inventive method, we applied a 30-deg phase rotation to the optimal wavelet, and repeated the FWI process of step 101 in FIG. 1 to build a new shallow earth model which is different from the model in FIG. 4. However, simulated primaries match measured primaries equally well in both of the two models. (Not shown in the drawings.) While inversion is not able to detect a wavelet phase rotation based on primary reflections only, multiples are used to retrieve wavelet phase rotation. FIG. 8 shows that simulated water-bottom multiple 21 cannot match recorded water-bottom multiple 20, as evidenced by data residual in 22. (This may be compared to FIG. 6 which shows corresponding results for the optimal wavelet.) If we apply phase rotation operator Φ to the simulated water bottom multiples in 21 until the best match with measured water bottom multiple in 20 is achieved, we are able to retrieve the phase rotation of the wavelet (30-deg rotation in this case) by applying Φ to the wavelet. In this step, we have chosen the water-bottom multiple as the event to design phase rotation operator Φ. In general, we can pick any local events with good separation of multiple and primary.

Wavelet Power Spectrum.

Figure 9:
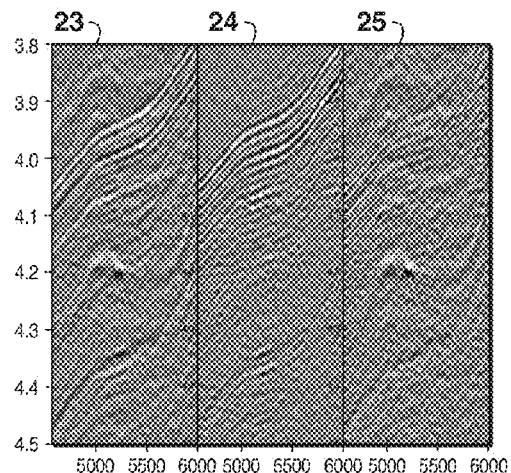
FIG. 9 shows results of multiple modeling based on a wavelet with an incorrect power spectrum (rich in low frequency compared with the optimal wavelet): (from left) recorded data, simulated multiples based on low frequency wavelet, and their residual.
Figure 10:
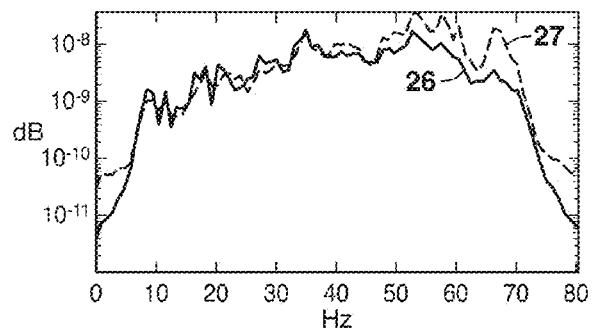
FIG. 10 shows a power spectrum of recorded multiples and that of simulated multiples, used to design a shaping filter of the present invention.
Figure 11:
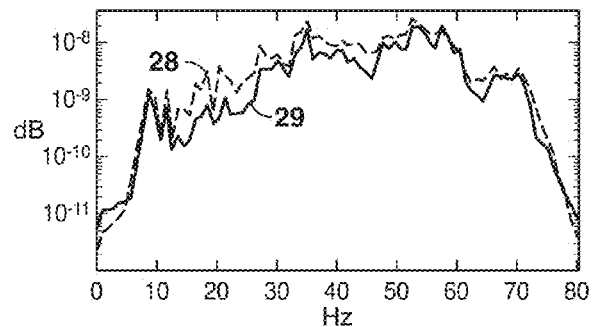
FIG. 11 shows power spectrum of recorded multiples, and that of simulated multiples after applying the shaping filter to the wavelet used in FIGS. 9 and 10.

To demonstrate how the wavelet's power spectrum, i.e. the absolute value of the coefficients of a Fourier expansion of the wavelet's waveform, can affect the agreement between simulated and measured multiples, a zero-phase shaping filter was applied to the optimal wavelet to suppress its high frequency energy. By then conducting steps 101 and 102 in FIG. 1, the result is now simulated multiples with a power spectrum 27 compared with the power spectrum of the recorded multiples 26, as shown in FIG. 10. It is clear that the simulated multiples have richer high frequency energy than the recorded multiples. This is expected as can be seen by the following. The inverted earth power spectrum E=P/S, where P and S are the power spectrum of primaries and wavelet, respectively. Since first order multiples are primaries reflected one more time by earth, the power spectrum of multiples is $M=E*P=P^2/S$. Since P is always matched by FWI on primaries, richer low frequencies in S results in richer high frequencies in M. As further evidence that the simulated multiples have richer high frequency energy than the recorded multiples, FIG. 9 shows that the multiple residual 25 of simulated multiples 24 and recorded multiples 23 contains high frequency energy. If this were the case at step 103 in the course of applying the present inventive method, we may design in step 104 a zero-phase shaping filter H that transforms power spectrum 26 to 27. The same shaping filter is then applied to the wavelet to get an optimal wavelet. As a result, after applying H to the wavelet used in FIGS. 9 and 10, the power spectrum of simulated multiples 29 is closer to the power spectrum of recorded multiples 28 in FIG. 11. (Curve 28 would have been identical to curve 26 if the same traces had been chosen to calculate power spectrum in each case.)

Upon finishing step 104 and cycling through step 101a second time, we have now the optimal wavelet and shallow subsurface model which predict the multiples of interest in step 102. By subtracting simulated multiples from recorded data in step 105, we extend primary reflections from "shallow" to "deep". Performing FWI on the deep primaries with the optimal wavelet generates a deep subsurface model to match the deep primaries.

Figure 12:
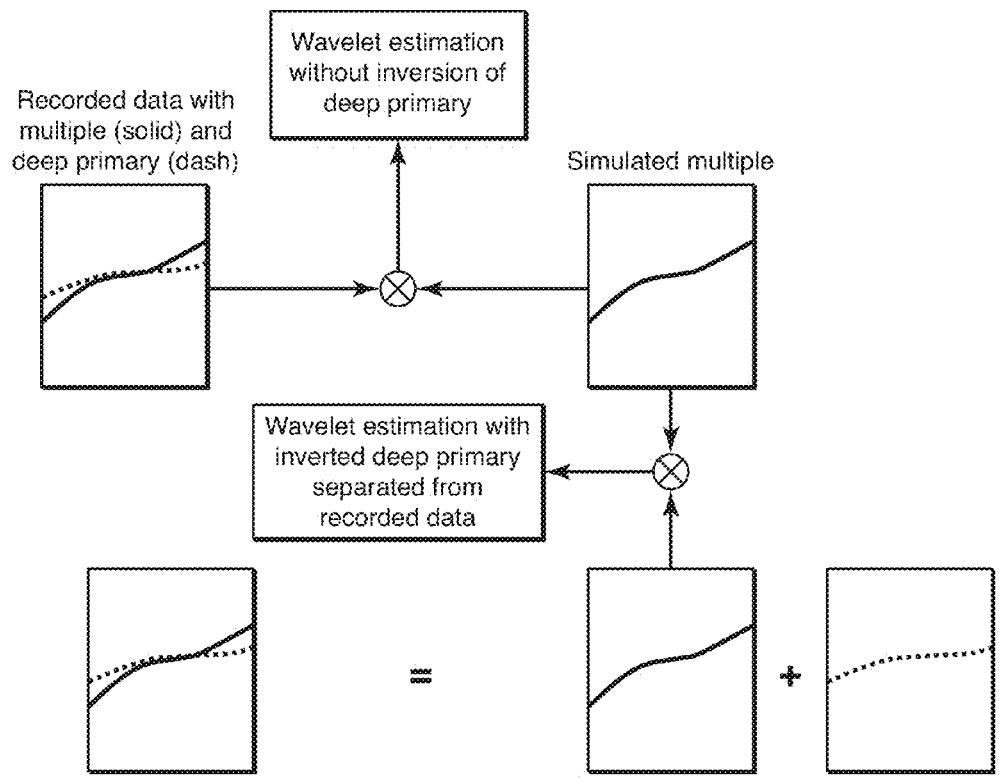
FIG. 12 illustrates how a decision made in step 103 of FIG. 1 is likely changed in step 106.

In step 106, the comparison in step 103 is repeated. In other words, multiple reflections are simulated again, but now using the model resulting from step 105, and these multiple predictions are compared to the recorded data in the selected window. FIG. 12 illustrates how the decision in step 103 may be changed after having the deep primaries inverted in step 105. If no strong primaries appear in the recorded data window during step 103, the wavelet estimated without inversion of deep primaries will be the final wavelet. This is the case in the field data study used as an example to illustrate the method here. In the case of strong deep primaries intersecting or overlapping with multiples in the selected window, it will now be possible to separate primary from multiple after step 105. Therefore, wavelet estimation in step 104 needs to be repeated, along with steps 101-106, in order to match simulated multiples with the multiples separated from deep primaries.

Figure 13:
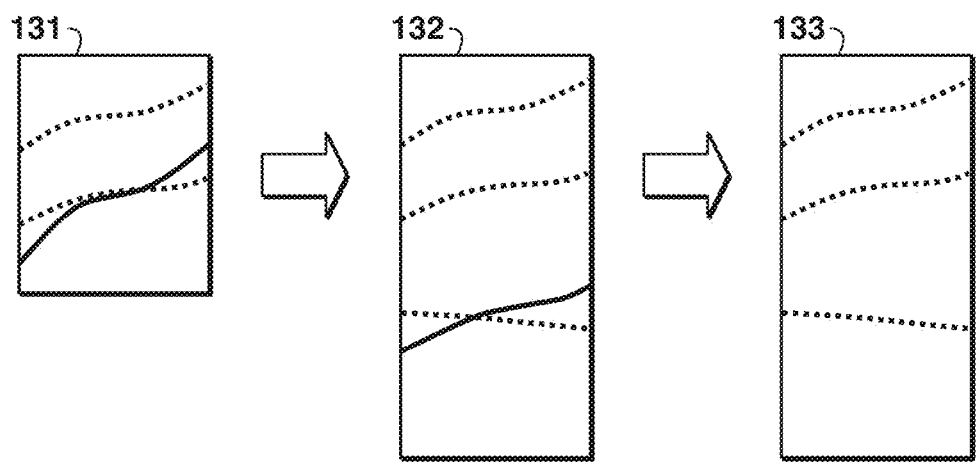
FIG. 13 illustrates recursion of the present inventive method from shallow to deep.

By repeating the process above, if necessary, the present inventive method will generate the optimal wavelet and subsurface model such that simulated primaries (shallow and deep), and multiples match recorded data. Notice that the concept of "shallow/deep primaries" and "multiples of interest" are defined recursively, i.e., "deep primary" will become "shallow primary" after "multiples of interest" are modeled and separated, and the multiples that are "of interest" will be the strong multiples in the depth layer to which the model is being extended in the recursive sequence. FIG. 13 illustrates this recursion. 131 shows the deep primary (lower - - - curve) masked by a multiple (solid line) generated from the shallow primary (upper - - - line). With the multiple thus revealed, it can be removed as shown in 132, where a multiple appearing at a greater depth can now be modeled, and so on until all primaries are inverted (133). Thus, the whole process can be repeated until a final wavelet and subsurface model (107) are achieved.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Tarantola, A., "Theoretical background for the inversion of seismic waveforms, including elasticity and attenuation," *Pure and Applied Geophysics* 128, 365-399 (1988).
Delprat-Jannaud, F. et al., "A fundamental limitation for the reconstruction of impedance profiles from seismic data," *Geophysics* 70, R1-R14 (2005).
Wang, K. et. al., "Simultaneous full-waveform inversion for source wavelet and earth model," *SEG Expanded Abstract* 28, 2537-2541, (2009).
Verschuur, D. J. et al., "Wavelet estimation by prestack multiple elimination," *SEG Expanded Abstract* 8, 1129-1132, (1989).
Verschuur, D. J. et al., "Adaptive surface-related multiple elimination." *Geophysics* 57(9), 1166-1177 (1992).
van Groenestijn, G. J. A. et al., "Estimating primaries by sparse inversion and application to near-offset data reconstruction," *Geophysics* 74(3), A23-A28 (2009)
Pica, A., "3D Surface-Related Multiple Modeling, Principles and Results," *SEG Expanded Abstract* 24, 2080-2083 (2005)
Pica, A. "Improvement to seismic processing for the elimination of multiple reflections," PCT Patent Application Publication No. WO 2006/037815.

The invention claimed is:

1. A computer-implemented method for inversion of measured seismic data from a subsurface region, comprising:
    (a) selecting a shallow layer from the seismic data, with the layer's depth determined to include primary reflections (shallow primaries), but exclude first arrivals of multiple reflections of interest (multiples);
    (b) inverting the shallow primaries, using an estimated seismic source wavelet, to obtain a shallow model of a physical property affecting propagation of seismic waves;
then simultaneously optimizing the shallow model and the seismic source wavelet in (c)-(e):
    (c) computer-simulating the multiples using the inverted shallow model and the estimated seismic source wavelet;
    (d) comparing the simulated multiples to corresponding multiples in the seismic data, and adjusting the estimated seismic source wavelet to reduce misfit;
    (e) repeating (b)-(d) at least once, or until the misfit is reduced below a predetermined level or other stopping condition is met; and
    (f) outputting a simultaneously optimized seismic source wavelet and shallow model.

2. The method of claim 1, further comprising extending applicability of the shallow model and the seismic source wavelet to a greater depth by inserting after (e) and before (f) a step comprising:
    (e1) subtracting the simulated multiples from the seismic data, then extending the shallow layer to a greater depth, and then repeating (b)-(e) for the extended shallow layer.

3. The method of claim 2, wherein:
    the multiple reflections of interest are strong multiples, "strong" being determined based on a preselected reflectivity threshold;
    the inverting of the shallow primaries comprises generating predicted data and optimizing the shallow model in depth domain to match the measured data in the shallow layer; and
    the comparing the simulated multiples to corresponding multiples in the seismic data is performed within a window selected to contain multiples and to minimize overlapping between multiples and primaries.

4. The method of claim 3, further comprising further extending the physical property model's depth range by repeating (e1) at least once.

5. The method of claim 3, wherein said adjusting the estimated seismic source wavelet comprises at least one of:
    applying a phase rotation to the estimated seismic source wavelet;
    applying an amplitude correction factor to the estimated seismic source wavelet;
    applying a spectral shaping filter to the estimated seismic source wavelet.

6. The method of claim 5, wherein the amplitude correction factor is amplitude of said simulated multiple reflection data divided by amplitude of said measured seismic data within a window selected to contain multiples and to minimize overlapping between multiples and primaries.

7. The method of claim 5, wherein the phase rotation is determined by varying the source wavelet's phase and repeating (b)-(d) and examining effect of the varied phase on the comparison in (d) for a water-bottom multiple reflection event or another seismic reflection event selected based on separation of multiple and primary reflections.

8. The method of claim 5, wherein the spectral shaping filter is designed based at least partly on an analysis of said mismatch in (d) for frequency content.

9. A computer program product, comprising a non-transitory computer usable medium having a computer readable program code embodied therein, said computer readable program code adapted to be executed to implement a method for optimizing a source wavelet and a physical property model for a subsurface region from seismic data utilizing multiple reflections in the seismic data, said method comprising:
    (a) selecting a shallow layer from the seismic data, with the layer's depth determined to include primary reflections (shallow primaries), but exclude first arrivals of multiple reflections of interest (multiples);
    (b) inverting the shallow primaries, using an estimated seismic source wavelet, to obtain a shallow model of a physical property affecting propagation of seismic waves;

then simultaneously optimizing the shallow model and the seismic source wavelet in (c)-(e):

(c) simulating the multiples using the inverted shallow model and the estimated seismic source wavelet;

(d) comparing the simulated multiples to corresponding multiples in the seismic data, and adjusting the estimated seismic source wavelet to reduce misfit;

(e) repeating (b)-(d) at least once, or until the misfit is reduced below a predetermined level or other stopping condition is met; and (f) outputting a simultaneously optimized seismic source wavelet and shallow model.

* * * * *